US008682396B2

(12) United States Patent
Yang et al.

(10) Patent No.: US 8,682,396 B2
(45) Date of Patent: Mar. 25, 2014

(54) VIBRATION MODULE FOR PORTABLE TERMINAL

(75) Inventors: Tae-Heon Yang, Daejeon (KR);
Yu-Dong Bae, Suwon-si (KR);
Dong-Soo Kwon, Daejeon (KR);
Young-Min Lee, Yongin-si (KR);
Eun-Hwa Lee, Suwon-si (KR);
Jeong-Seok Lee, Anyang-si (KR);
Dong-Bum Pyo, Daejeon (KR);
Young-Jun Cho, Daejeon (KR)

(73) Assignees: Samsung Electronics Co., Ltd (KR);
Korea Advanced Institute of Science and Technology (KR)

( * ) Notice: Subject to any disclaimer, the term of this patent is extended or adjusted under 35 U.S.C. 154(b) by 38 days.

(21) Appl. No.: 13/279,749

(22) Filed: Oct. 24, 2011

(65) Prior Publication Data
US 2012/0108299 A1  May 3, 2012

(30) Foreign Application Priority Data
Oct. 22, 2010 (KR) .................... 10-2010-0103662

(51) Int. Cl.
*H04M 1/00* (2006.01)
(52) U.S. Cl.
USPC ....... 455/567; 455/575.1; 455/347; 455/90.3; 381/128; 381/114; 381/126; 381/127; 381/396; 310/15; 310/12.04; 310/25; 310/30; 310/36; 335/252; 335/90; 335/222; 335/229; 335/235
(58) Field of Classification Search
USPC .............. 455/567, 575.1, 347, 90.3; 381/128, 381/114, 126, 127, 129, 396; 310/15, 25, 310/30, 36, 81, 21, 12.04; 335/252, 90, 335/222, 229, 235, 248, 296
See application file for complete search history.

(56) References Cited

U.S. PATENT DOCUMENTS

| | | | |
|---|---|---|---|
| 7,358,633 B2 | 4/2008 | Kweon et al. | |
| 2004/0104625 A1* | 6/2004 | Wakuda et al. | 310/15 |
| 2006/0276225 A1* | 12/2006 | Suzuki et al. | 455/557 |
| 2007/0085425 A1* | 4/2007 | Hirashima | 310/15 |
| 2007/0178942 A1* | 8/2007 | Sadler et al. | 455/567 |
| 2010/0283331 A1 | 11/2010 | Kwon et al. | |
| 2010/0315185 A1* | 12/2010 | Kagami et al. | 335/229 |

FOREIGN PATENT DOCUMENTS

| | | |
|---|---|---|
| JP | 06-120866 | 4/1994 |
| JP | 2010178419 A * | 8/2010 |
| KR | 1020020085597 | 11/2002 |
| KR | 1020030074882 | 9/2003 |

(Continued)

*Primary Examiner* — Khai M Nguyen
(74) *Attorney, Agent, or Firm* — The Farrell Law Firm, P.C.

(57) ABSTRACT

Disclosed is a vibration module for a portable terminal that includes a housing, a magnetic moving part movable in a first direction within the housing; an elastic member supported between the opposite ends of the magnetic moving part and inner walls of the housing, and a solenoid coil provided in the housing. The vibration module is positioned at one end of the moving section by the magnetic force of the magnetic moving part and an object around the magnetic moving part, allowing the vibration module to provide a user with a feeling similar to a click feeling via the acceleration produced at a stopping instant. In addition, when vibrating, the vibration module generates sufficient vibration power through acceleration at the instant of changing moving direction at the ends of the moving section, to provide an alarm function, such as an incoming call notification.

18 Claims, 9 Drawing Sheets

(56) References Cited

FOREIGN PATENT DOCUMENTS

| KR | 1020030094715 | 12/2003 |
| KR | 1020040038509 | 5/2004 |
| KR | 1020050083528 | 8/2005 |
| KR | 1020010025176 | * 11/2007 |
| KR | 1020100007383 | 1/2010 |
| KR | 1020100020575 | 2/2010 |
| KR | 1020100120735 | 11/2010 |

* cited by examiner

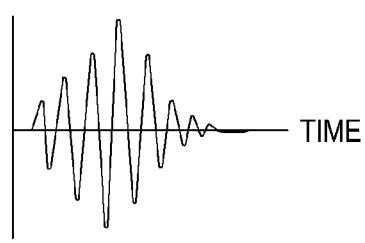
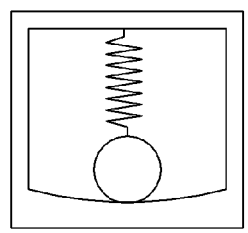
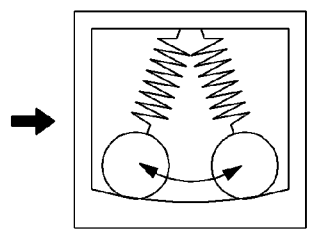
FIG.1A  FIG.1B  FIG.1C
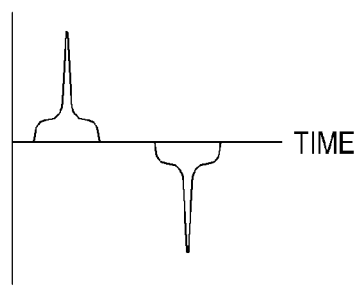
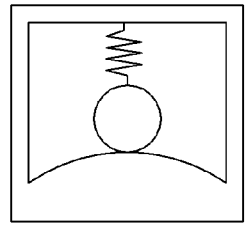
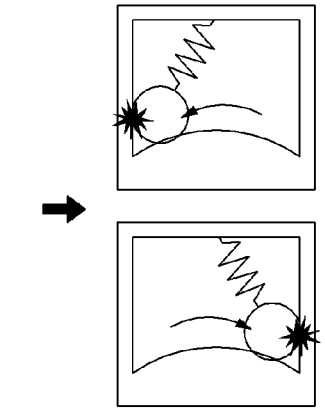
FIG.1D  FIG.1E  FIG.1F

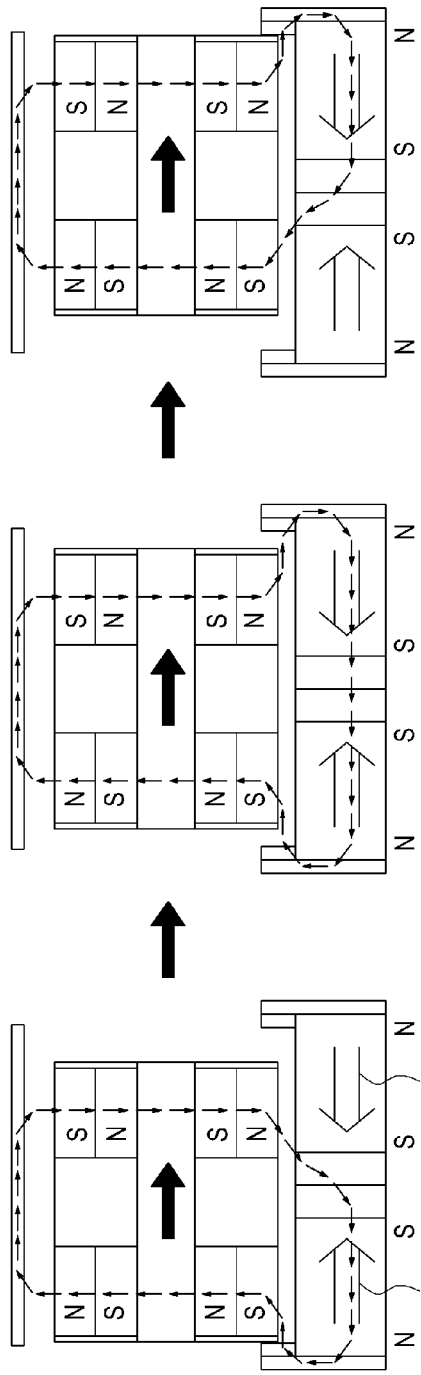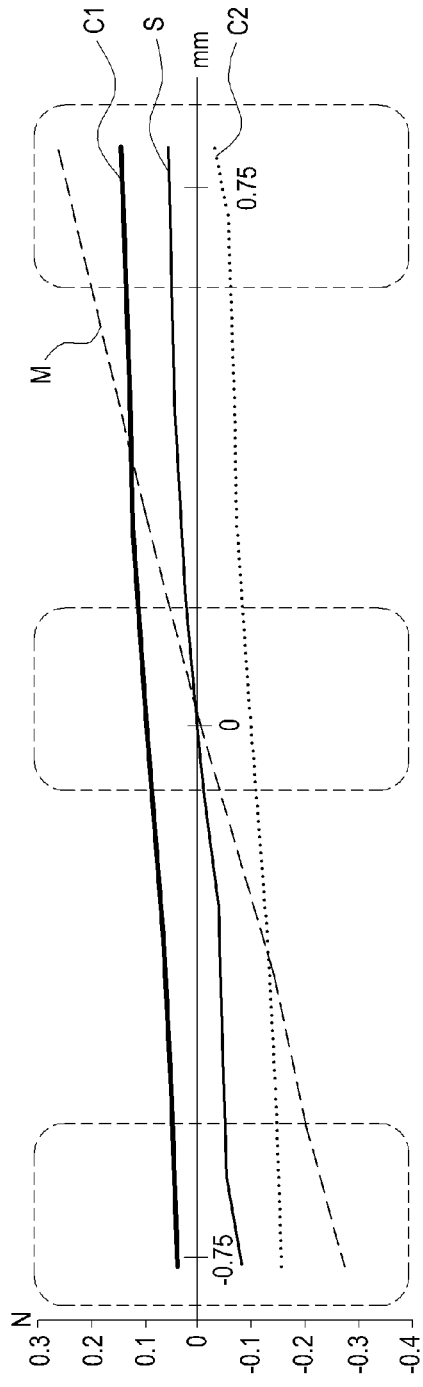

5v Square wave, 1Hz

1Hz Square Wave
±3v Square wave
Up:2.76G, Down:-2.47G
→ Average:2.615G

5Hz Square Wave
±3v Square wave
Up:3.12G, Down:-2.31G
→ Average:2.715G

10Hz Square Wave
±3v Square wave
Up:3.12G, Down:-2.31G
→ Average:2.715G

VIBRATION MODULE FOR PORTABLE TERMINAL

PRIORITY

This application claims priority under 35 U.S.C. §119(a) to an application filed in the Korean Industrial Property Office on Oct. 22, 2010, and assigned Serial No. 10-2010-0103662, the contents of which are incorporated herein by reference.

BACKGROUND OF THE INVENTION

1. Field of the Invention

The present invention relates generally to a portable terminal and, more particularly, to a vibration module for a portable terminal, which can provide a haptic feedback function.

2. Description of the Related Art

Haptic feedback refers to a method for expressing information based on a user's sense of touch and skin contact, includes providing additional meaning by a force feedback function, for example to remotely control a robot arm. Recently, efforts have been made to utilize haptic feedback in portable terminals, such as cellular phones, not only as a simple vibration function for a incoming call notification, but also as a function for providing notification that a signal value of a key selected by the user is normally input when the user manipulates a touch screen.

In general, when there is a call request, i.e. an incoming call, or when a text message is received, a portable terminal provides a vibration mode as one of various methods to provide notification of same. Operation in the vibration mode involves operating a vibration motor of the portable terminal.

Considering the portability of portable terminals, a coin type vibration motor or a cylinder or bar type vibration motor may be employed as a vibration motor in a portable terminal. However, such motors merely provide an incoming call notification function.

Recently, with the appearance of touch screen phones, which can provide a full-browsing screen when using the Internet or the like, input devices, such as keypads, are implemented as virtual keypads on touch screens. Such virtual keypads sense points contacted by a user to input signal values allocated to the points, respectively. A typical button-type keypad can provide a click feeling to a user with dome switches or the like, so that the user can recognize the manipulation of a keypad via sense of touch. Therefore, a user skilled with portable terminal keypad data entry can recognize whether figures and characters intended to be input by key manipulation are indeed being input without having to visually confirm that the figures and characters being entered by manipulation appear on a display of the portable terminal. However, when manipulating a keypad implemented on a touch screen, the user must directly confirm the input values through a display device since a click feeling cannot be provided like that provided by a button type keypad with dome switches.

As a result, efforts are being made to provide a haptic feedback function to portable terminals equipped with a touch screen type input device to enhance convenience and allow a user to avoid having to confirm input values by viewing a display device. Such a haptic function for a portable terminal is implemented by operating a vibration motor when a touch screen is manipulated.

However, conventional coin type, cylinder type and bar type vibration motors are limited in implementing the haptic feedback function due to lengthy response time thereof. That is, since a residual vibration time interval of a coin type motor, a cylinder, or a bar type vibration motor is long, a difficulty arises when recognizing via sense of touch whether signal values of keys manipulated by the user are correctly input, particularly when a user rapidly and continuously inputs various keys. A time interval of a vibration motor is a complete operation cycle, which includes a time during which operation of the motor continues due to inertia, until the motor completely stops.

Linear motors with low power consumption and high reliability have been proposed as vibration motors, with improved short response time. However, such conventional linear motors have disadvantages of having a single resonance frequency and abruptly reduced vibration power, even if an operating frequency deviates only about 2 to 3 Hz from the resonance frequency. Such conventional linear motors can sufficiently provide an alarm function, such as an incoming call notification, when operated within its resonance frequency. However, such conventional linear motors are also limited in providing the haptic feedback function since due to low response velocity. That is, the linear motor can provide sufficient vibration power after about 30 ms from the time point that an input signal is applied, and the vibration caused by inertia can be completely terminated after about 50 ms from the instant the input signal is interrupted.

Therefore, although the incoming call notification function can be sufficiently conducted using existing linear motors, there is a limit in providing the haptic feedback function for confirming accurate manipulation of a touch screen.

SUMMARY OF THE INVENTION

Accordingly, the present invention has been made to solve the above-mentioned problems occurring in the conventional systems, and an aspect of the present invention provides a vibration module for a portable terminal, improved to have short response time, to provide a more effective click feeling and haptic feedback function even during time of rapid, continuous key input operation via a touch screen.

Another aspect of the present invention provides a vibration module for a portable terminal to generate various haptic patterns corresponding to touch screen operations, such as drag, as well as providing a click feeling similar to a button click feeling at the time of key input through a touch screen.

Yet another aspect of the present invention provides a vibration module for a portable terminal to provide sufficient vibration power in terms of an alarm function, such as an incoming call notification, as well as providing a good haptic feedback function.

In accordance with an aspect of the present invention, there is provided a vibration module for a portable terminal, including a housing, a magnetic moving part installed to be movable in a first direction within the housing, elastic members supported between the opposite ends of the magnetic moving part and inner walls of the housing, respectively, and a solenoid coil provided in the housing.

In accordance with another aspect of the present invention, a magnetic vibration module is provided for a portable terminal, with the magnetic vibration module including a magnetic force generator, and an electromagnetic force generator arranged parallel to the magnetic force generator, wherein the magnetic force generator reciprocates in response to an input signal applied to the electromagnetic force generator.

The vibration modules as described above are preferably positioned at either end of a moving section due to the magnetic force between the magnetic moving part and an object surrounding the magnetic moving part. Therefore, in response to an input signal applied to solenoid coil(s), the vibration module moves from a position at one of the opposite ends of the moving section to another position at another end of the moving section. As a result, the vibration module provides a user with a feeling similar to a click feeling, via an acceleration that is produced at an instant of stopping of the vibration module. In addition, when vibrating, the vibration module generates sufficient vibration power by acceleration at an instant of changing a moving direction at the ends of the moving section, thereby providing an alarm function, such as an incoming call notification. Further, if the amplitude of the magnetic moving part is limited by use of yokes or the like, the magnetic moving part can hit the yokes to generate impacts at the instant of arrival at the ends of the moving section, to generate vibration for implementing a click feeling or an haptic feedback function in other various patterns.

BRIEF DESCRIPTION OF THE DRAWINGS

The above and other aspects, features and advantages of the present invention will be more apparent from the following detailed description taken in conjunction with the accompanying drawings, in which:

FIGS. 1A to 1C describe operation of a conventional vibration module;

FIGS. 1D to 1F describe operation of a vibration module for a portable terminal in accordance with the present invention;

FIGS. 5A to 5D describe the operating mechanism of the vibration module of FIG. 2;

DETAILED DESCRIPTION OF EMBODIMENTS OF THE PRESENT INVENTION

Figure 2:
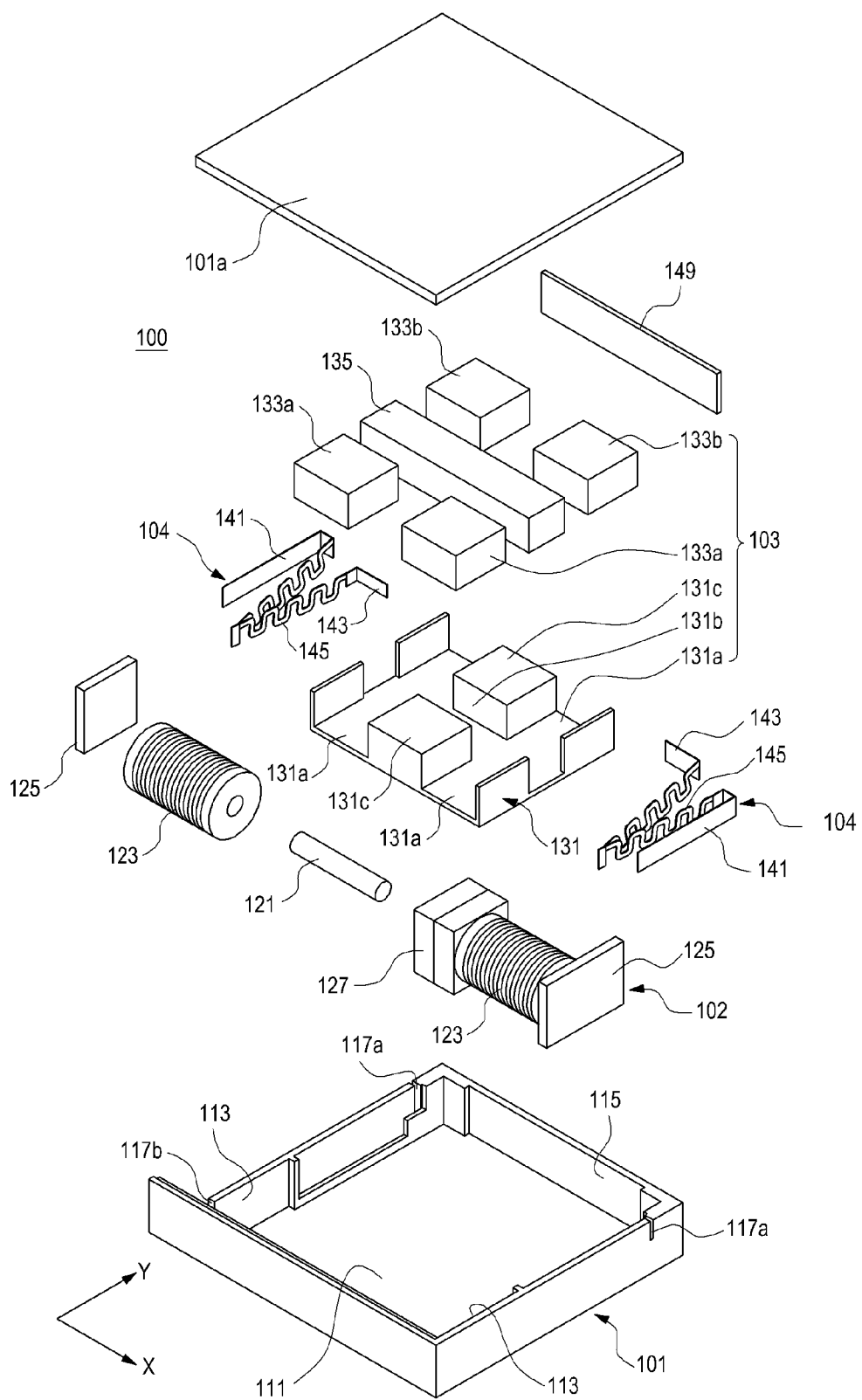
FIG. 2 is an exploded perspective view showing a vibration module for a portable terminal in accordance with an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIGS. 1A to 1C schematically show the operating principle of a conventional linear motor, and FIGS. 1D to 1F schematically show the operating principle of a vibration module for a portable terminal in accordance with the present invention.

As shown in FIG. 1A, when the conventional linear motor operates, the vibration gradually strengthens, thereby limiting a rapid response of the linear motor. In addition, it is difficult for the linear motor to produce a haptic pattern corresponding to a rapid and continuous key input due to vibration caused by inertia, even after interruption of an input signal.

In addition, in such conventional linear motor, the vibrator tends to move toward a central position away from opposite ends of a linear reciprocating section, i.e. toward a neutral position shown in FIG. 1B, at which position the conventional vibrator remains in a stable stopped state. When vibrated, the conventional vibrator has a highest velocity at the neutral position, and the velocity is gradually reduced as the vibrator approaches either opposite end of the linear reciprocating section, as shown in FIG. 1C, whereby the conventional linear motor cannot produce a sufficiently high vibration power. Therefore, it is difficult to implement an alarm function, e.g. an incoming call notification, with such conventional linear motor.

In contrast, the vibration module of the present invention provides a vibrator having an unstable state at the neutral position, as shown in FIG. 1E, thereby tending to move toward one opposite end of the reciprocating section. Therefore, as shown in FIG. 1F, the vibrator moves to either of the opposite ends of the reciprocating section while being gradually accelerated, thereby producing an acceleration at an instant of changing a moving direction of the vibrator at the opposite ends of the reciprocating section that is sufficient to provide an alarm function, such as an incoming call notification. Moreover, since the vibrator is installed within a confined space, the vibrator may hit the walls of the space at the opposite ends of the reciprocating section, thereby producing higher impact force.

The vibration module is implemented with a magnetic force generator and an electromagnetic force generator. That is, the electromagnetic force is generated in response to a signal input to the electromagnetic force generator, and the magnetic force of the magnetic force generator interact to linearly reciprocate the electromagnetic force generator.

If the magnetic force generator is formed with a fixed magnetic path, the vibration module can effectively use the magnetic force of the magnetic force generator. The magnetic path is provided by first and second magnetic paths, and constant magnetic forces are produced in the first and second magnetic paths according to input signals applied to the electromagnetic force generator. At this time, the electromagnetic forces produced in respective first and second magnetic paths preferably act opposite to each other.

At the neutral position, the magnetic force generator forms a magnetic path which passes both of the first and second magnetic paths. However, if an input signal is input to the electromagnetic force generator, the first and second magnetic paths produce electromagnetic forces acting opposite to each other, which causes the magnetic force generator to move toward either of the first and second magnetic paths.

At this time, it is possible to switch the directions of the electromagnetic forces produced by the first and second magnetic paths by controlling the input signals applied to the electromagnetic force generator, which consequently allows the magnetic force generator to alternately use the first and second magnetic paths. As a result, the magnetic force generator can linearly reciprocate. This can be accomplished by arranging the first and second magnetic paths along the magnetic force generator moving direction.

The first and second magnetic paths can be implemented using a core extending along the magnetic force generator moving direction, in which case the electromagnetic force generator can be implemented by winding a coil around the core.

At this time, since the attraction force between the first and second magnetic paths and the magnetic force generator may be an obstacle to the reciprocation of the magnetic force generator, it is desired to provide a separate equilibrium member and to arrange the magnetic force generator between the first and second magnetic paths and the equilibrium member. As such, the attraction force between the equilibrium member and the magnetic force generator will counterbalance the attraction force between the first and second magnetic paths and the magnetic force generator.

If the limiters are arranged at the opposite ends of the linear reciprocating section of the magnetic force generator, respectively, the magnetic force generator hits the limits while reciprocating between the limits, thereby generating impact force. The impact force produced thereby can be usefully employed for implementing an alarm function, such as an incoming call notification, in a portable terminal.

In addition, if elastic members are provided at the opposite ends of the magnetic force generator, it is possible to set a resonance frequency by using the elastic constant of the elastic members. The resonance frequency may be set in accordance with the mass of the magnetic force generator. If the magnetic force generator reciprocates at the resonance frequency, it is possible to additionally strengthen the vibration power or the impact force produced at the opposite ends of the reciprocating section.

FIGS. 2 through 10 show specific embodiments of the present invention.

Figure 3:
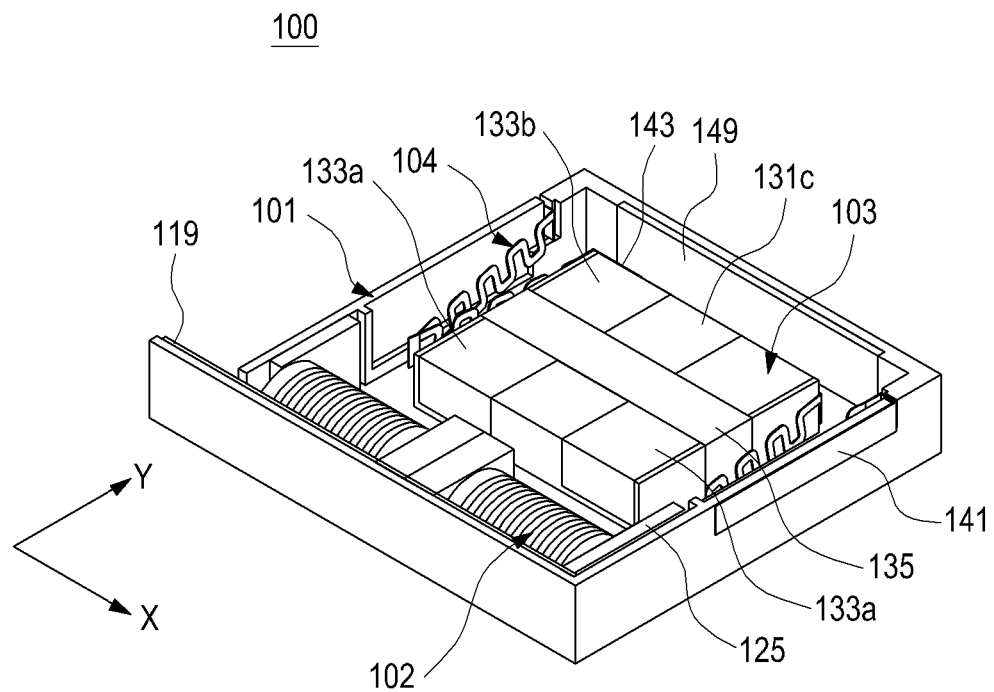
FIG. 3 is a perspective view showing the vibration module of FIG. 2 in the assembled state.
Figure 10:
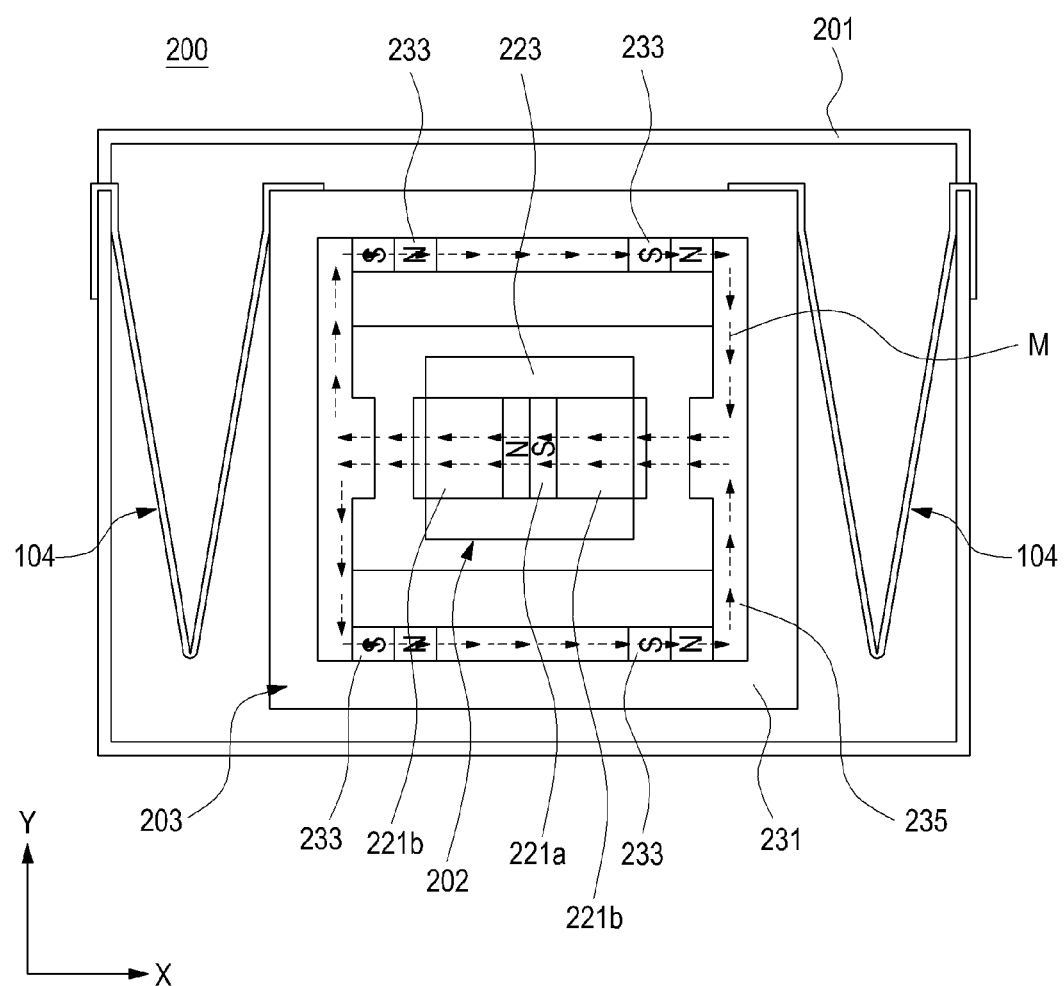
FIG. 10 is a top plan view showing a vibration module for a portable terminal in accordance with another embodiment of the present invention.

As shown in FIGS. 3 and 10, within a housing 101 or 201, the vibration module 100 or 200 for a portable terminal includes a solenoid coil 102 or 202 arranged in a stator form, the solenoid coil serving as an electromagnetic force generator and forming a magnetic path; and a magnetic moving part 103 or 203 arranged in a vibrator form as magnetic force generator, the magnetic moving part 103 or 203 being supported by elastic members 104 within the housing 101 or 201. As a result, the magnetic moving part 103 or 203 is vibrated in the housing 101 or 201 in response to a signal input to the solenoid coil 102 or 202 while being supported by the elastic members 104. Although the term 'vibration' generally means that an object is shaken and moved, as used herein 'vibration' indicates regular reciprocation of the vibrator in a predetermined section or moving of the vibrator from one of the opposite ends of the section to the other.

The solenoid coil 102 or 202 is anchored in the housing 101 or 201, and the magnetic moving part 103 or 203 is installed to be movable in the first (X) direction in the housing 101 or 201. In the first (X) direction, the elastic members 104 are interposed between the internal walls of the housing 101 or 201 and the opposite ends of the magnetic moving part 103 or 203, respectively. That is, the magnetic moving part 103 or 203 is installed to reciprocate in the first (X) direction while being supported by the elastic members 104. If an input signal is applied to the solenoid coil 102 or 202, the magnetic moving part 103 or 203 vibrates within the housing 101 or 201 due to an interaction between a magnetic force of the magnetic moving part and magnetic forces produced by the solenoid coil 102 or 202.

At this time, as shown in FIG. 2, a pair of solenoid coils 102 may be arranged along the first (X) direction, and if the same input signals are applied to each coil of the pair of solenoid coils, the electromagnetic forces produced by the solenoid coils 102 act opposite to each other.

Figure 4A:
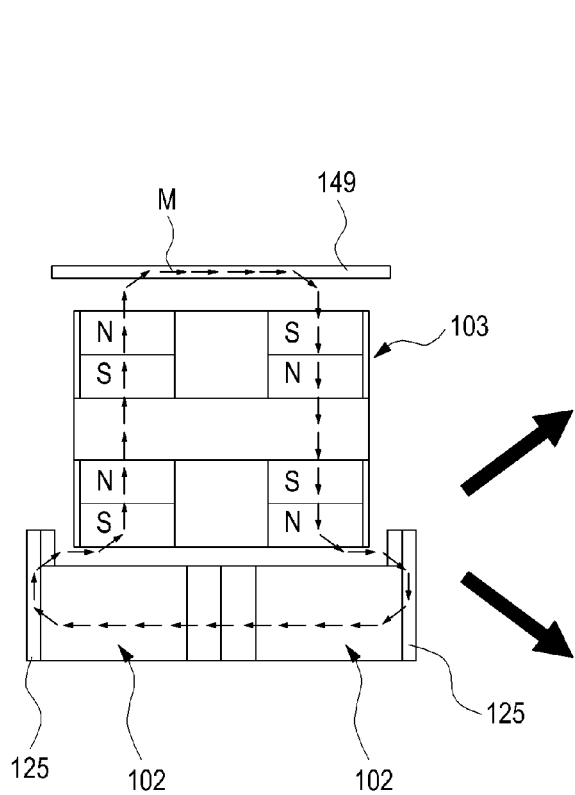
FIGS. 4A to 4C describe the operation of the vibration module of FIG. 2.
Figure 4B:
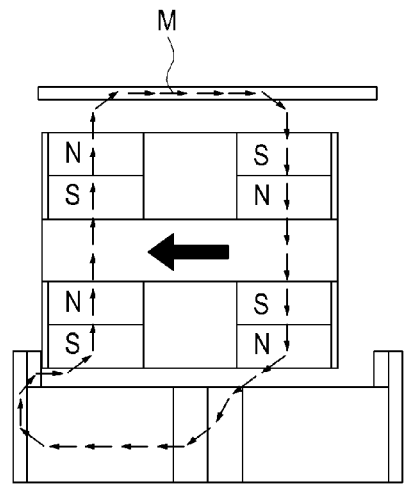
Figure 4C:
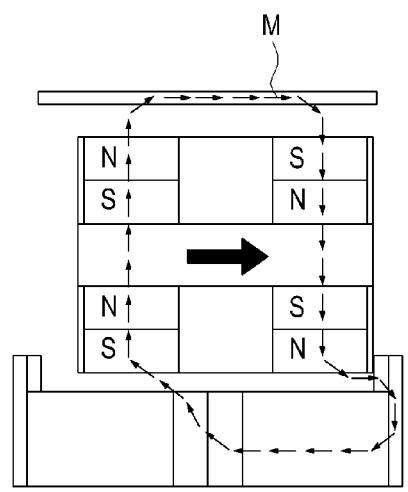
Figure 6:
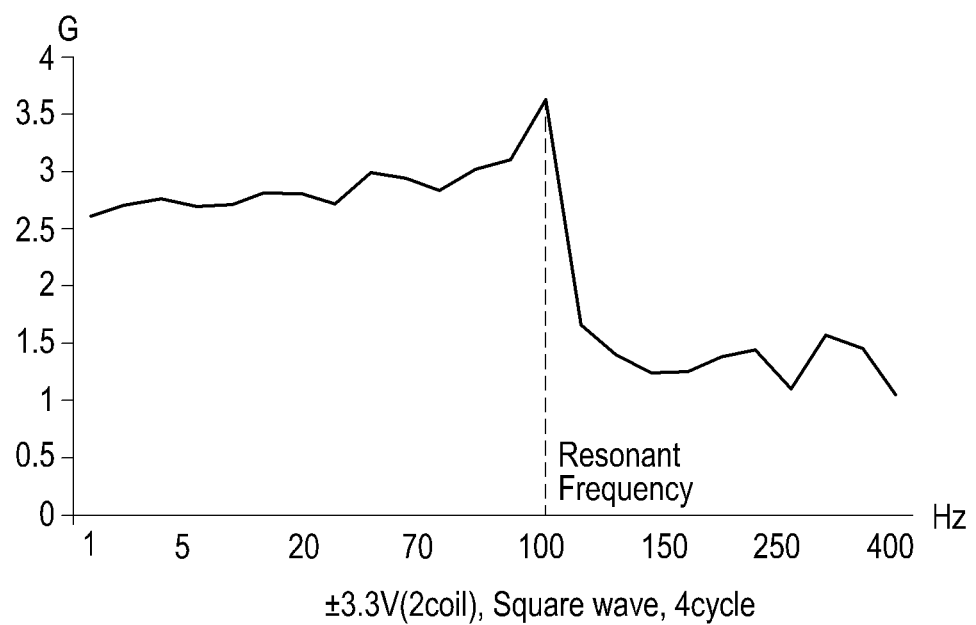
FIG. 6 is a graph showing a frequency response characteristic of the vibration module of FIG. 2.

As shown in FIG. 4a, when a signal is not applied to the solenoid coils 102, the magnetic moving part 103 forms a common magnetic path with the solenoid coils 102 at the central point (hereinafter referred to as a "neutral point") of the moving section. However, if the same input signals are applied to the solenoid coils 102, the magnetic moving part 103 is moved toward one of the solenoid coils 102 which provides attraction force, thereby being positioned as shown in either FIG. 4B or FIG. 4C.

If yokes 125 are provided adjacent to the opposite ends of the magnetic moving part 103 in the housing 101, as shown in FIG. 2, the magnetic moving part 103 can be moved toward one of the yokes 125 by the magnetic force between the magnetic bodies in the magnetic moving part 103 and the yokes, even if small external force is applied or shaking is caused at the neutral point. The embodiment shown in FIG. 2 illustrates that the yokes 125 are arranged on the solenoid coils 102, respectively, which will be described in more detail below. If the magnetic moving part 203 is formed to wrap the solenoid coil 202, it may be possible to incorporate a magnetic body 221a within the solenoid coil 202 itself and to add a configuration to perform the role of the yokes to the magnetic moving part 203, as described below and shown in FIG. 10.

Consequently, in the vibration module 100 or 200 for a portable terminal, the magnetic moving part 103 or 203, which is a vibrator, does not remain in a stable state at the neutral point, and tends to move to one side of the moving section even with minute shaking. Therefore, in a state in which the vibration module 100 or 200 is mounted in a real product, the magnetic moving part 103 or 203 is positioned at one side of the moving section rather than at the neutral point, and vibrates or moves to the other side of the moving section, in response to a signal applied to the solenoid coil 102 or 202, more specifically, depending on the frequency of an input signal.

As shown in FIGS. 2 and 3, the housing 101 has a receiving space formed in the inside thereof, and is opened at one side. The opened side of the housing 101 is closed by a separate cover member 101a. Among the inner walls of the housing, seating faces 113 are formed on a pair of opposite inner walls. Yokes 125 are attached and anchored on respective seating faces 113, with the yokes further described below. In addition, a plurality of slits 117a and 117b are formed in the housing 101 for installation of the elastic members 104, or paths for wiring a flexible printed circuit board 119 (FIG. 2) or the like.

A solenoid coil 102 includes a core part 121 arranged to extend along the first (X) direction, and a coil part 123 wound around the core part 121, wherein a pair of such solenoid coils 102 are arranged within the housing along the first (X) direction. When no signal is applied to the coil parts 123, the core part 121 forms a magnetic path with the magnetic moving part 103. If an input signal is applied to the coil parts 123, a magnetic path is formed biased to one of the coil parts 123, with the magnetic moving part 103. The core part 121 forming the magnetic path with the magnetic moving part 103 can be controlled by the input signal applied to the coil parts 123. Through this, the magnetic moving part 103 forms a magnetic path alternately with the core part 121 to produce linear reciprocating force.

A central yoke 127 may be arranged between the solenoid coils 102, wherein the yokes 125 are arranged between the ends of the solenoid coils 102 and the inner walls of the housing 101, respectively. The yokes 125 may be anchored to the seating faces 113, respectively.

In an embodiment of the present invention, the winding direction of the left solenoid coil 102 is opposite to that of the right solenoid coil 102, thereby producing electromagnetic forces acting opposite to each other when a same input signal is applied to the solenoid coils 102. As a result, when the same input signal is applied to the solenoid coils 102, the magnetic moving part 103 produces an attraction force with one of the solenoid coils 102, and a repulsion force in relation to the other solenoid coil 102.

The magnetic moving part 103 has a weight member 131 and magnetic bodies 133*a* and 133*b*. In the present embodiment, two pairs of magnetic bodies 133*a* and 133*b* are provided, with the magnetic bodies arranged at the left side being referred to herein as a "first magnetic part" and the magnetic bodies arranged on the other side being referred to herein as a "second magnetic part" for the convenience of description. The first magnetic part includes a pair of magnetic bodies 133*a* arranged adjacent to the solenoid coils 102. The second magnetic part includes a pair of magnetic bodies 133*b* arranged away from the solenoid coils 102. Although the present embodiment exemplifies a configuration that each of the first and second magnetic parts includes a pair of magnetic bodies, it is possible to configure each of the first and second magnetic parts with a single magnetic body. In such a case, if the weight member 131 is made in a shape similar to that shown in FIGS. 2 and 3, each of the magnetic bodies of the first and second magnetic parts will have a shape extending in the second (Y) direction perpendicular to the first (X) direction.

The weight member 131 can provide sufficient vibration power when the vibration module is operated by increasing the weight of the magnetic moving part 103. Therefore, the weight member 131 is preferably manufactured using tungsten or an alloy thereof, which has the heaviest weight per unit mass. The weight member 131 is provided with seating grooves 131*a* for arranging the magnetic bodies 133*a* and 133*b*. In addition, protrusions 131*c* are formed between the seating grooves 131*a* arranged in the first (X) direction, respectively, and another seating groove 131*b* extends between the grooves 131*a* arranged in the second (Y) direction and between the protrusions 131*c*. In the seating groove 131*b*, a magnetic path member 135, such as an iron core, may be arranged. The magnetic path member 135 extends in the first (X) direction. The magnetic path member 135 stably forms a magnetic path between the magnetic bodies 133*a* and 133*b*, thereby strengthening the magnetic forces produced by the magnetic bodies 133*a* and 133*b*.

In arranging the magnetic bodies 133*a* and 133*b*, the magnetic bodies 133*a* and 133*b* are positioned so that south poles (S-poles) thereof are arranged adjacent to the solenoid coil 102, and north poles (N-poles) thereof are arranged away from the solenoid coil 102. In addition, the magnetic bodies of the second magnetic part are arranged with the N-poles thereof are arranged adjacent to the solenoid coil 102, and the S-poles thereof are arranged away from the solenoid coil 102. Of course, the polarities of the magnetic bodies may be reversely arranged in relation to the above-mentioned arrangement.

As such, the vibration module 100 also forms a magnetic path M as shown in FIG. 4 in the interior thereof. That is, the magnetic path M extends along the magnetic bodies 133*a* and 133*b*, and the core parts 121 of the solenoid coils 102 is formed.

In order to form the stable magnetic path M within the vibration module 100, and to mitigate the attraction force between the magnetic moving part 103 and the core parts 121 so that the movement of the magnetic moving part 103 in the first (X) direction can be smoothly conducted, an equilibrium member 149 may be provided in the vibration module 100.

On an inner wall of the housing 101 opposite to one side of the magnetic moving part 103 in the second (Y) direction, an anchoring groove 115 is formed, in which the equilibrium member 149 is installed. As such, among the magnetic bodies 133*a* of the magnetic moving part 103, one pair is arranged adjacent to the equilibrium member 149, and an other pair is arranged adjacent to the core parts 121.

The equilibrium member 149 and the core parts 121 may be manufactured from a magnetizable material, e.g. steel, to produce an attraction force with the magnetic bodies 133*a* and 133*b*. As such, the attraction force acting between the magnetic moving part 103 and the core part 121 can be attenuated by the attraction force acting between the magnetic moving part 103 and the equilibrium member 149. As a result, the magnetic moving part 103 can move in the first (X) direction without being biased to one side in the second (Y) direction between the solenoid coils 102 and the equilibrium member 149 while being supported by the elastic members 104. That is, the elastic members 104 are installed between the magnetic moving part 103 and the inner walls of the housing to limit the movement of the magnetic moving part 103 in the second (Y) direction. As a result, the magnetic moving part 103 can move in the first (X) direction without being attached to the equilibrium member 149 and the core part 121.

The elastic members 104 interconnect the magnetic moving part 103 and the housing 101, to float the magnetic moving part 103 in the housing 101. In addition, since the elastic members 104 have their own resonance frequency, they will intensively vibrate the magnetic moving part 103 when an input signal corresponding to the resonance frequency of the elastic members 104 is applied to the solenoid coil 102. The opposite ends of each elastic members 104 have free ends 141 and 143 which are bent to have shapes to be anchored to the housing 101 and the magnetic moving part 103, respectively, and the free ends 141 and 143 are interconnected by an elastic element 145.

Free end 141 is bound to the housing 101 through a slit 117*a* formed in the housing 101, and anchored to wrap an inner wall and an outer wall of the housing 101. The other free end 143 takes a shape bent to face a part of the outer face of one of the opposite ends of the magnetic moving part 103 and the equilibrium member 149, and to wrap the part of the outer face. The elastic element 145 preferably extends in a zigzag shape, and generally takes a "V" shape when seen from a top plan view. When the magnetic moving part 103 is vibrated, the elastic element 145 can be deformed to such an extent that it is positioned nearly in a single plane. However, if the displacement of the magnetic moving part 103 is limited, the elastic element 145 may not be positioned substantially in a single plane. Meanwhile, each of the elastic members 104 may be formed only by the elastic element 145 without having the free ends 141 and 143. In such a case, the opposite ends of the elastic members 104 may be attached to the magnetic moving part 103 and the inner walls of housing 101 through welding or the like, respectively.

As described above, in the vibration module 100, an input signal, i.e. electric current, is applied to the solenoid coils 102 through the flexible printed circuit board 119. As shown in FIG. 2, the flexible printed circuit board 119 is positioned on the inside of the housing 101, attached via slit 117*b* formed in the housing 101, and connected to the solenoid coils 102.

Referring to FIG. 4 again, the yokes 125 arranged at the ends of the solenoid coils 102 can limit the displacement of the magnetic moving part 103. That is, the yokes 125 are arranged to interfere with the magnetic moving part 103 at the opposite ends of the moving section of the magnetic moving part 103. As such, if the magnetic moving part 103 moves, the yokes 125 periodically contact with the magnetic moving part 103, thereby producing impact force, and if the magnetic moving part 103 is periodically vibrated, the impact force will be regularly produced.

If an input signal is not applied to the solenoid coils 102, it is difficult for the attraction force between the core parts 121 of the solenoid coils 102 and the magnetic moving part 103 to keep the magnetic moving part in the stopped state at the neutral point. Furthermore, if the yokes 125 are provided, the attraction force between the magnetic moving part and the yokes 125 acts more strongly, which causes the magnetic moving part 103 to be more instable at the neutral point. Consequently, if an input signal is not applied to the solenoid coils 102, the magnetic moving part 103 remains at one end of the moving section, and more particularly, in contact with one of the yokes 125.

Operation of the vibration module 100 is described in further detail with reference to FIGS. 5A to 5D. FIGS. 5a to 5c show magnetic paths formed depending on the position of the magnetic moving part 103 and moving directions, and FIG. 5D shows a graph showing forces produced in accordance with the position of the magnetic moving part 103.

In FIG. 5D, the horizontal axis corresponds to the position of the magnetic moving part 103 in the first (X) direction, and the vertical axis corresponds to the forces acting on the magnetic moving part 103. Here, a force having a positive (+) value acts to move the magnetic moving part 103 rightward, and a force having a negative (−) value acts to move the magnetic moving part 103 leftward.

In addition, the curve designated by 'M' in FIG. 5D indicates forces acting on the magnetic moving part 103 when only the magnetic moving part 103 and the yokes 124 are provided, the curve designated by 'S' indicates forces acting on the magnetic moving part 103 when the elastic members 104 are provided together with the magnetic moving part 103 and the yokes 125, and the curves designated by 'C1' and 'C2' indicate forces acting on the magnetic moving part 103 by electromagnetic forces from the magnetic moving part 103, the yokes 125, the elastic members 104, and the solenoid coils 102 when input signals are applied to the solenoid coils 102.

Under the premise that the magnetic moving part 103 is arranged to be movable only in the first (X) direction, if only the solenoid coils 102, the yokes 125 and the magnetic moving part are arranged in the housing 101, the magnetic moving part 103 tends to move to one end of the moving section. Although the force acting on the magnetic moving part 103 has a zero (0) value, the magnetic moving part 103 will move leftward or rightward since it is inevitable that a small force will act on the magnetic moving part 103. Since the attraction force between the core parts 121 and the magnetic moving part 103 acts even if the yokes 125 are not provided, it is impossible for the magnetic moving part 103 to remain in the stable state at the neutral point.

If the elastic members 104 with the same elastic constants and specifications are arranged at the opposite ends of the magnetic moving part 103, the force acting on the magnetic moving part 103 may be somewhat alleviated depending on the position of the magnetic moving part 103.

In addition, if an input signal is applied to the solenoid coil 102, the magnetic moving part 103 moves from left to right, or from right to left, with FIGS. 5A to 5C showing a process in which the magnetic moving part 103 moves from left to right. The magnetic paths formed by the magnetic moving part 103 generally follow a clockwise pattern. However, by changing the polarities of the magnetic bodies 133a and 133b arranged in the magnetic moving part 103, the direction of the magnetic paths can be changed.

By the input signals applied to the solenoid coils 102, the left solenoid coil 102 generates electromagnetic force E2 (in FIG. 5A) in a direction opposite to the magnetic path of the magnetic moving part 103, and the right solenoid coil 102 generates electromagnetic force in the direction equal to the magnetic path of the magnetic moving part 103. Therefore, the magnetic moving part 103 moves rightward. At this time, the 'C1' curve indicates the forces for moving the magnetic moving part 103 from left to right when input signals are applied to the solenoid coils 102, and the 'C2' curve indicates the forces for moving the magnetic moving part 103 from right to left when input signals are applied to the solenoid coils 102.

Referring to the 'C1' and 'C2' shown in FIG. 5D, the forces for substantially moving the magnetic moving part 103 in the vibration module 100 are strengthened as the magnetic moving part 103 moves toward either opposite end of the moving section.

The term, "left" or "right" used in describing the operating mechanism of the vibration module 100 with reference to FIG. 5 generally indicates any one of the opposite ends of the moving section of the magnetic moving part 103.

Meanwhile, if limiters for the moving section of the magnetic moving part 103, for example, the yokes 125 are arranged at the opposite ends of the moving section of the magnetic moving part 103 to limit the moving section of the magnetic moving part 103, an impact force is produced when the magnetic moving part 103 is vibrated, thereby providing vibration capable of being felt by a user. At this time, as the magnetic moving part 103 approaches either end of the moving section of the magnetic moving part 103, the forces acting on the magnetic moving part 103 are gradually increased. Therefore, the impact force produced when the magnetic moving part 103 hits the yokes 125 will have an intensity sufficient to provide a haptic feedback function. In addition, if a resonance frequency is established by arranging the elastic members 104 between the magnetic moving part 103 and the housing 101, a high resonance vibration power is generated at the corresponding frequency to perform the alarm function of a portable terminal, as discussed below.

A result obtained by measuring the frequency response characteristic of the vibration module 100 configured as described above is shown in FIG. 6, which shows a frequency response characteristic in accordance with the change of input signals in terms of frequency when the same input signals are applied to the solenoid coils 102 with input voltages of ±3.3 V, respectively. As seen from FIG. 6, the vibration module 100 produces a vibration acceleration of about 2.5 G (with G being the constant of gravity) for the input signals less than 100 Hz, and produces a vibration acceleration of about 3.5 G at the input signal of 100 Hz, which is the resonance frequency. Therefore, it is possible to vibrate the magnetic moving part 100 in various patterns by applying various frequencies less than 100 Hz as the input signals, to produce various haptic patterns.

Meanwhile, the resonance frequency of the vibration module 100 can be adjusted depending on the elastic constant of the elastic members 104. For example, if the elastic members 104 with an elastic constant of 266 N/m are employed, the resonance is adjusted to approximately 80 Hz.

Figure 7:
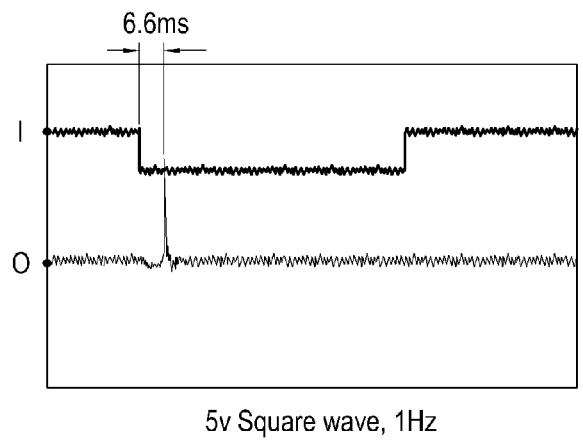
FIG. 7 is a graph showing the response time measured for the vibration module of FIG. 2.

FIG. 7 is a graph showing a result obtained by measuring the response time of the vibration module 100 by applying an input signal (I) of 5V, 1 Hz to the solenoid coil. A time delay of the vibration module 100 is a time interval required to produce vibration or impact after the input signal (I) is applied to the solenoid coil 102 and the vibration module is operated. As shown, a time delay of the vibration module 100 of only 6.6 ms is obtained. In comparison, for a linear motor employed in a conventional portable terminal, approximately 30 ms is required for the linear motor to arrive at resonance frequency after an input signal is applied, and vibration acceleration is about 1.5 Grms (root mean square). Furthermore, such conventional linear motor requires about 50 ms until for vibration to stop after the input signal is interrupted.

FIG. 7 shows that the vibration module 100 has a substantially rapid response time, and substantially does not provide residual vibration, i.e. resonance until the vibration is completely stops after an input signal interruption.

Figure 8A:
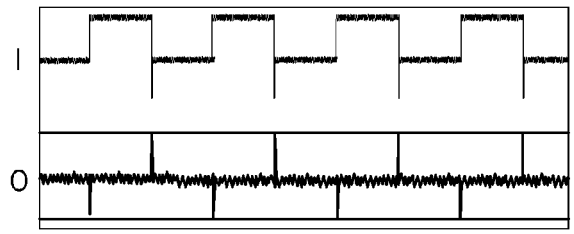
FIGS. 8A to 8C are graphs showing measured vibration acceleration of the vibration module of FIG. 2.
Figure 8B:
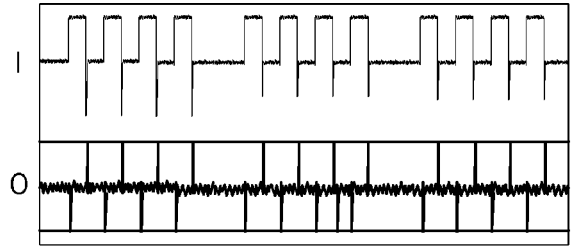
Figure 8C:
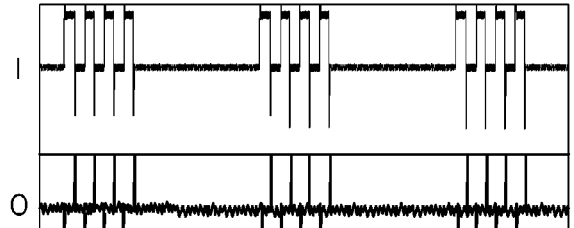
Figure 9:
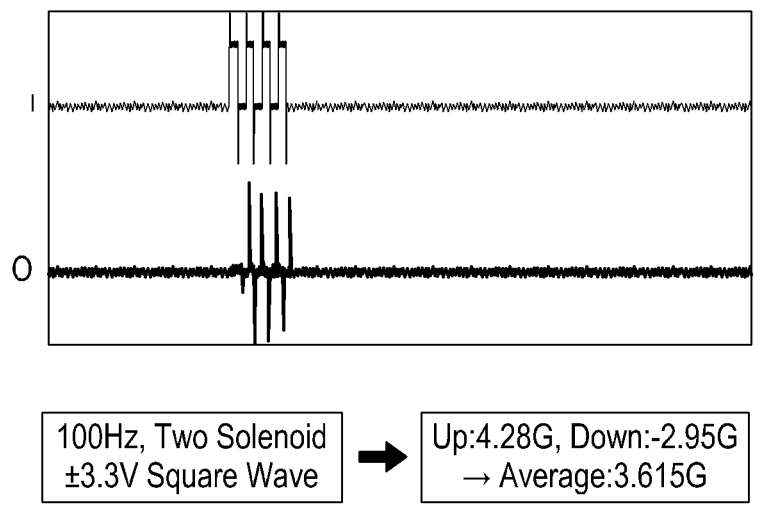
FIG. 9 is a graph showing measured vibration acceleration at a resonance frequency of the vibration module of FIG. 2.

FIGS. 8A to 8C show results 'O' obtained by measuring produced vibration accelerations while varying the frequencies of the input signal 'I' to the vibration module 100. FIG. 9 shows results 'O' obtained by measuring the vibration accelerations of the vibration module 100 when a resonance frequency of 100 Hz is used as the input signal 'I'.

As shown in FIGS. 8A to 8C and FIG. 9, since each of the waveforms of vibration accelerations of the vibration module 100 takes an impulse waveform, there exists substantially no time interval until the vibration module arrives at the resonance after an input signal is applied, or until vibration completely stops after the input signal interruption. In addition, since each of the vibration waveforms of the vibration module taking an impulse waveform is substantially identical to the frequencies of its input signal, it is possible to freely control the frequencies of the input signal from zero (0) to the resonance frequency to generate various haptic patterns. Furthermore, since the vibration accelerations of the vibration module 100 are substantially higher than those of conventional linear motors, the vibration module 100 can sufficiently provide both a haptic feedback function and a conventional alarm function, e.g. an incoming call notification or the like even if an input signal with a resonance frequency is not applied. However, in order to differentiate the time interval for operating the vibration module with a haptic feedback function from the time interval for operating the vibration module with an alarm function, the vibration module is preferably set that the alarm function, such as an incoming call notification, is executed at the resonance frequency.

In addition, if an input signal is input so that the vibration module impacts only once, the magnetic moving part 103 will hit one of the yokes 125 to produce impact, which can be usefully used for providing a click feeling to a user when the user inputs figures or characters.

FIG. 10 is a top plan view showing a vibration module 200 in accordance with another embodiment of the present invention. As compared to the previous embodiment, the vibration module 200 in accordance with the present embodiment has a solenoid coil 202 and magnetic moving part 203 that are different from those of the previous embodiment in terms of construction but are similar to the previous embodiment in terms of operation and response characteristic. Therefore, the following description focuses on the construction of the solenoid coil 202 and the magnetic moving part 203.

The solenoid coil 202 is anchored to the housing 201, wherein the solenoid coil 202 is arranged at a central area of the bottom of the receiving space. The solenoid coil 202 includes a core part, and a coil part 223 is wound on an outer periphery of the core part, the core part includes a magnetic body 221a and magnetizable members 221b arranged along the first (X) direction. The magnetizable members 221b are arranged at opposite ends of the magnetic body 221a.

The magnetic moving part 203 includes a weight member 231 arranged to surround the solenoid coil 202, and additional magnetic bodies 233 arranged on the weight member 231. A magnetic body 233 is arranged adjacent to each of the four corners of the weight member 231, and an additional magnetizable member 235 is arranged on the weight member 231 to form a magnetic path M, as shown in FIG. 10. The additional magnetizable members 235 are arranged to surround the solenoid coil 202, together with the weight member 231.

The magnetic bodies 233 and the additional magnetizable member 235 arranged on the magnetic moving part 203 are also referred to herein as "first magnetic bodies" and "first magnetizable members," respectively, and the magnetic bodies 221a and the magnetizable members 221b of the core part are also referred to as "second magnetic bodies" and "second magnetizable members," respectively. The first magnetic bodies 233 are positioned so that the polarities thereof are arranged along the first (X) direction, and the second magnetic bodies 221a are positioned so that the polarities thereof are arranged opposite to those of the first magnetic bodies 233. As such, two magnetic paths M are formed in the vibration module 200. Meanwhile, each of the first magnetizable members 235 has a protrusion, which extends inwardly of the corresponding inner wall of the weight member 231 to face the opposite ends. The second magnetizable members 221b and first magnetizable member 235 may be selectively magnetized in accordance with the electric current applied to the solenoid coil 202 or the magnetic bodies 221a and 233.

In the embodiment of FIG. 10, since repulsive forces act between the first and second magnetizable members 235 and 221b, and attraction forces act between the protrusions of the first magnetizable members 235 and the second magnetic bodies 221a, the magnetic moving part 203 is stable at the neutral point. However, as in the previous embodiment, the magnetic moving part 203 moves toward either of the opposite ends of the moving section by minute shaking or the like. Therefore, the inner walls of the magnetic moving part 203, in particular the protrusion portions of the first magnetizable members 235 come into contact with either end of the solenoid coil 202. A person skilled in the art will appreciate that if sufficient attraction forces can be produced between the first magnetizable members 235 and the second magnetic bodies 221a even if the first magnetizable members 235 do not have protrusions extending inwardly of the inner walls of the weight member 231, making it unnecessary to form protrusions on the first magnetizable members 235.

In the vibration module 200 configured as described above, the magnetic moving part 203 also moves from left to right or from right to left, or reciprocates within a moving section of a predetermined extent, depending on an input signal applied to the solenoid coil 202.

Consequently, a magnetic moving part is positioned at one side of the moving section by an attraction force between the magnetic moving part and a yoke or an attraction force between the magnetic moving part and a solenoid coil. In response to an input signal applied to the solenoid coil, the magnetic moving part moves from one side to the other side, or reciprocates within the moving section, thereby producing a predetermined impact or shock wave-type vibration. Such an impact or shock-wave type vibration can provide various haptic patterns when a user manipulates a portable terminal through a virtual input device implemented on a screen of the portable terminal. In addition, the impact or shock wave-type vibration can provide various feelings when playing a game, as well as when performing an input action, thereby providing sense of reality.

While the invention has been shown and described with reference to certain embodiments thereof, it will be understood by those skilled in the art that various changes in form and details may be made therein without departing from the spirit and scope of the invention as defined by the appended claims.

What is claimed is:

1. A vibration module for a portable terminal, the vibration module comprising:
    a housing;
    a magnetic moving part movable in a first direction within the housing;
    an elastic member supported between opposite ends of the magnetic moving part and inner walls of the housing;
    a pair of yokes installed on the inner walls of the housing; and
    a solenoid coil provided in the housing,
    wherein when any signal is not input to the solenoid coil, the magnetic moving part remains in contact with one of the yokes.

2. The vibration module of claim 1,
    wherein, in response to a signal input to the solenoid coil, the magnetic moving part vibrates in the first direction between the yokes while being supported by the elastic member.

3. The vibration module of claim 2, wherein, in response to another signal input to the solenoid coil, the magnetic moving part moves from a position in which magnetic moving part contacts one of the yokes to contact the other one of the yokes.

4. The vibration module of claim 1, wherein the magnetic moving part comprises:
    a first magnetic part positioned at one end of the magnetic moving part with a south pole thereof arranged adjacent to the solenoid coil and with a north pole thereof arranged away from the solenoid coil; and
    a second magnetic part positioned at the other end of the magnetic moving part with a north pole thereof arranged adjacent to the solenoid coil, and with a south pole thereof arranged away from the solenoid coil.

5. The vibration module of claim 4, wherein each of the first and second magnetic parts has a pair of magnetic bodies arranged along a second direction perpendicular to the first direction.

6. The vibration module of claim 5, wherein the magnetic moving part further comprises a magnetic path member extending between the pair of magnetic bodies of the first magnetic part, and between the pair of magnetic bodies of the second magnetic part.

7. The vibration module of claim 4, wherein the magnetic moving part further comprises a weight member having seating grooves formed on one side thereof, with the first and second magnetic parts positioned in respective seating grooves.

8. The vibration module of claim 7, wherein the weight member is formed from tungsten.

9. The vibration module of claim 1, wherein the solenoid coil has a core part arranged in the first direction and a coil part wound around the core part, and
    wherein a pair of solenoid coils are arranged along the first direction.

10. The vibration module of claim 9, wherein the magnetic moving part comprises:
    a first magnetic part positioned at one end of the magnetic moving part with a north pole arranged adjacent to a first solenoid coil of the solenoid coils and a south pole arranged away from the first solenoid coil; and
    a second magnetic part positioned at an other end of the magnetic moving part with a south pole arranged adjacent to a second solenoid coil and a north pole arranged away from the second solenoid coil.

11. The vibration module of claim 9, further comprising an iron piece arranged between the solenoid coils.

12. The vibration module of claim 9, wherein the first solenoid coil and the second solenoid coil are arranged to generate oppositely acting electromagnetic forces when a same input signal is applied to each of the first solenoid coil and the second solenoid coil.

13. The vibration module of claim 1, further comprising an equilibrium member installed on a first inner wall of the housing along the first direction, wherein an attraction force between the magnetic moving part and the equilibrium member attenuates another attraction force between the magnetic moving part and the solenoid coil.

14. The vibration module of claim 1, wherein the magnetic moving part comprises a weight member surrounding the solenoid coil and a pair of first magnetic bodies provided on the weight member.

15. The vibration module of claim 14, wherein the magnetic moving part further comprises a first magnetizable member provided on the weight member surrounding the solenoid coil and the weight member, and
    wherein the first magnetic bodies positioned on the first magnetizable member.

16. The vibration module of claim 14, wherein the solenoid coil comprises a core part arranged along the first direction and a coil part wound around the core part, and
    wherein the core part has a second magnetic body and second magnetizable members provided at opposite ends of the second magnetic body, the second magnetic body and the second magnetizable members being arranged along the first direction.

17. The vibration module of claim 14, wherein the magnetic moving part further comprises a first magnetizable member provided on the weight member to wrap the solenoid coil together with the weight member, and
    wherein when a signal is not input to the solenoid coil, one side inner wall of the weight member comes into contact with one end of the solenoid coil by the attraction force between the second magnetic body and the first magnetizable member.

18. The vibration module of claim 16, wherein the magnetic moving part further comprises a first magnetizable member provided on the weight member to wrap the solenoid coil together with the weight member, the first magnetizable member having protrusions extending inwardly of inner walls of the weight member to face opposite ends of the solenoid coil,
    wherein when a signal is not input to the solenoid coil, one of the protrusions of the first magnetizable member comes into contact with one of the opposite ends of the solenoid coil by an attraction force between the second magnetic body and the first magnetic member.

* * * * *